US007628365B2

(12) United States Patent
Lee

(10) Patent No.: US 7,628,365 B2
(45) Date of Patent: Dec. 8, 2009

(54) MONITOR STAND

(75) Inventor: Jin Bum Lee, Goomi-si (KR)

(73) Assignee: LG Electronics Inc., Seoul (KR)

( * ) Notice: Subject to any disclaimer, the term of this patent is extended or adjusted under 35 U.S.C. 154(b) by 169 days.

(21) Appl. No.: 11/702,653

(22) Filed: Feb. 6, 2007

(65) Prior Publication Data
US 2007/0278362 A1 Dec. 6, 2007

(30) Foreign Application Priority Data
Jun. 1, 2006 (KR) .................. 10-2006-0049419

(51) Int. Cl.
A47F 1/10 (2006.01)

(52) U.S. Cl. .............. 248/297.21; 248/921; 248/922; 248/371; 248/289.11; 248/282.1; 361/681; 361/682

(58) Field of Classification Search ............ 248/921, 248/922, 371, 289.11, 282.1, 297.21; 361/681–682; 16/239
See application file for complete search history.

(56) References Cited

U.S. PATENT DOCUMENTS

| 6,189,849 | B1 * | 2/2001 | Sweere et al. ............ 248/286.1 |
| 6,381,125 | B1 * | 4/2002 | Mizoguchi et al. ......... 361/682 |
| 7,124,984 | B2 * | 10/2006 | Yokouchi et al. ......... 248/125.8 |
| 7,198,240 | B2 * | 4/2007 | Chen ..................... 248/284.1 |
| 7,237,755 | B2 * | 7/2007 | Cho et al. ............... 248/274.1 |
| 7,317,613 | B2 * | 1/2008 | Quijano et al. ............ 361/686 |
| 7,370,838 | B2 * | 5/2008 | Jeong et al. ............. 248/125.7 |
| 7,410,143 | B2 * | 8/2008 | Chen ..................... 248/422 |
| 2005/0051692 | A1 * | 3/2005 | Jung et al. ................ 248/371 |
| 2005/0205745 | A1 * | 9/2005 | Lee ....................... 248/371 |
| 2006/0138298 | A1 * | 6/2006 | Yuan ..................... 248/371 |
| 2007/0096001 | A1 * | 5/2007 | Lee ....................... 248/371 |
| 2007/0152125 | A1 * | 7/2007 | Lee ....................... 248/398 |
| 2007/0195495 | A1 * | 8/2007 | Kim et al. ................ 361/681 |

FOREIGN PATENT DOCUMENTS

KR 10-2005-0136028 * 12/2005

OTHER PUBLICATIONS

KR 10-2005-0136028 Abstract (English Translation).*
KR 10-2005-0136028 Claims (English Translation).*
KR 10-2005-0136028 Specification (English Translation).*

* cited by examiner

Primary Examiner—J. Allen Shriver, II
Assistant Examiner—Michael McDuffie
(74) Attorney, Agent, or Firm—Birch, Stewart, Kolasch & Birch, LLP

(57) ABSTRACT

Provided is a monitor stand, capable of preventing an "auto-lift" phenomenon that occurs when a monitor installed thereon is tilted past a predetermined angle, due to a shift in the monitor's weight. The monitor stand includes a base, a stand body, a stand top assembly, a stop slide, an elastic member, and a frictional clutch. The stand body is supported by the base. The stand top assembly is pivotably supported by the stand body. The top slide slides along the stand top assembly and has the monitor installed thereon. The elastic member is supported on the stand top, to provide elasticity to the top slide in an upward direction. The frictional clutch confines and releases the top slide to and from the stand top.

11 Claims, 5 Drawing Sheets

MONITOR STAND

BACKGROUND OF THE INVENTION

1. Field of the Invention

The present invention relates to a stand for supporting a monitor, and more particularly, to a monitor stand with tilt and height adjustment, and capable of preventing an "auto lift up" phenomenon that occurs when the monitor is tilted past a predetermined angle, due to a change in the acting direction of the monitor's weight.

2. Description of the Related Art

Generally, flat panel monitors such as liquid crystal display devices (LCD) require stands for supporting the monitors on a desk or table for use. Such stands have a hinge assembly interposed between the rear of the monitor and the stand to allow a user to adjust the monitor to a desired angle.

Recently, monitor stands have been developed to adjust not only the tilt angle, but also the height of the monitor, for added convenience.

Referring to FIG. 1, a monitor stand according to the related art will be described in detail.

As shown in FIGS. 1 and 2, a monitor stand according to the related art includes a stand top 4 installed to raise and lower the monitor 1, a stand body 2 pivotably supporting the stand top 4, and a base 3 for supporting the stand body 2 on a desk or other flat surface.

When a user grasps the upper or lower portion of the monitor 1 and pulls it forward, the stand top 4 pivots about the upper hinge 5 to adjust the tilt angle of the monitor 1.

In order to support the monitor 1, a spiral spring (not shown) that provides an elastic force in an upward direction equal to the weight W of the monitor 1, is provided inside the stand top 4. The spiral spring provides a uniform elastic force F to support the monitor 1 in an upward direction, regardless of its deformed state.

Accordingly, after the user moves the monitor 1 upwards or downwards with respect to the stand 4 and releases the force applied to the monitor 1, the monitor 1 maintains its current position due to the tension of the spiral spring (not shown) and the friction between components. Height adjusting of the monitor 1 is thus accomplished.

The lower portion of the stand body 2 is pivotably coupled to the base 3 with a lower hinge 6 interposed therebetween.

However, as shown in FIG. 2, in the above configuration of a monitor stand according to the related art, when a user pivots the monitor 1 to the rear, and the tilt angle exceeds a predetermined angle (30° from a vertical line, for example), the weight W of the monitor 1 is divided, so that the equilibrium between the tension F of the spiral spring and component of force W1 in a sliding direction of the monitor 1 is lost.

That is, when the monitor 1 has pivoted by an angle $\theta$ with respect to a vertical line, the component of force W1 of the monitor weight W1 is $W \cos \theta$, and becomes less than the tension F of the coil spring, so that when the difference exceeds the friction between the components, an auto lift up of the monitor 1 occurs. Therefore, an adjustment of the monitor to the height desired by the user does not occur. In severe cases, auto lift up of the monitor may cause it to collide with another object, causing a user unpleasantness.

SUMMARY OF THE INVENTION

Accordingly, the present invention is directed to a monitor stand that substantially obviates one or more problems due to limitations and disadvantages of the related art.

An object of the present invention is to provide a monitor stand that effectively prevents the auto lift up phenomenon of the monitor from occurring when the acting direction of the weight of monitor is changed due to tilting of the monitor installed on a stand beyond a predetermined angle.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a monitor stand including: a base; a stand body supported by the base; a stand top assembly pivotably supported by the stand body; a top slide for sliding along the stand top assembly and having a monitor installed thereon; an elastic member supported on the stand top, for providing elasticity to the top slide in an upward direction; and a frictional clutch for confining and releasing the top slide to and from the stand top.

The stand top assembly may include: a stand top forming a guide rail oppositely at either end thereof; and a stand top supporter pivotably supported by the stand body, for supporting the stand top.

The guide rail may include an inclined surface inclined inward in an upward direction on an inner side thereof, and the frictional clutch may include a clutch pad interposed between the top slide and the inclined surface, for sliding along the guide rail, the clutch pad having an opposite inclined surface facing the inclined surface.

The inclined surface may be an inner surface of a guide pad disposed at the inner side of the guide rail of the stand top or an inner surface of the guide rail formed on the stand top.

The top slide may include a slide pad fixed thereto, for sliding along the clutch pad.

The frictional clutch may include: a rotating round plate rotatably coupled to the stand top; a rotating link connected to an outer portion of the rotating round plate through a hinge at one end thereof; a connecting link having one end thereof connected to another end of the rotating link through a hinge, for moving in a direction in which the guide rail extends; and a lever fixed at a center of the rotating round plate, wherein another end of the connecting link is connected to the clutch pad through a hinge.

The clutch pad may be elastically supported in an upward direction by the coil spring supported by the stand supporter.

The stand top may include a rotating round plate fixing bracket installed thereon, for supporting the rotating round plate of the frictional clutch, and the elastic member may be a spiral spring that winds and unwinds according to a position of the top slide. The monitor may be installed on the top slide with a monitor fixing bracket interposed therebetween.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
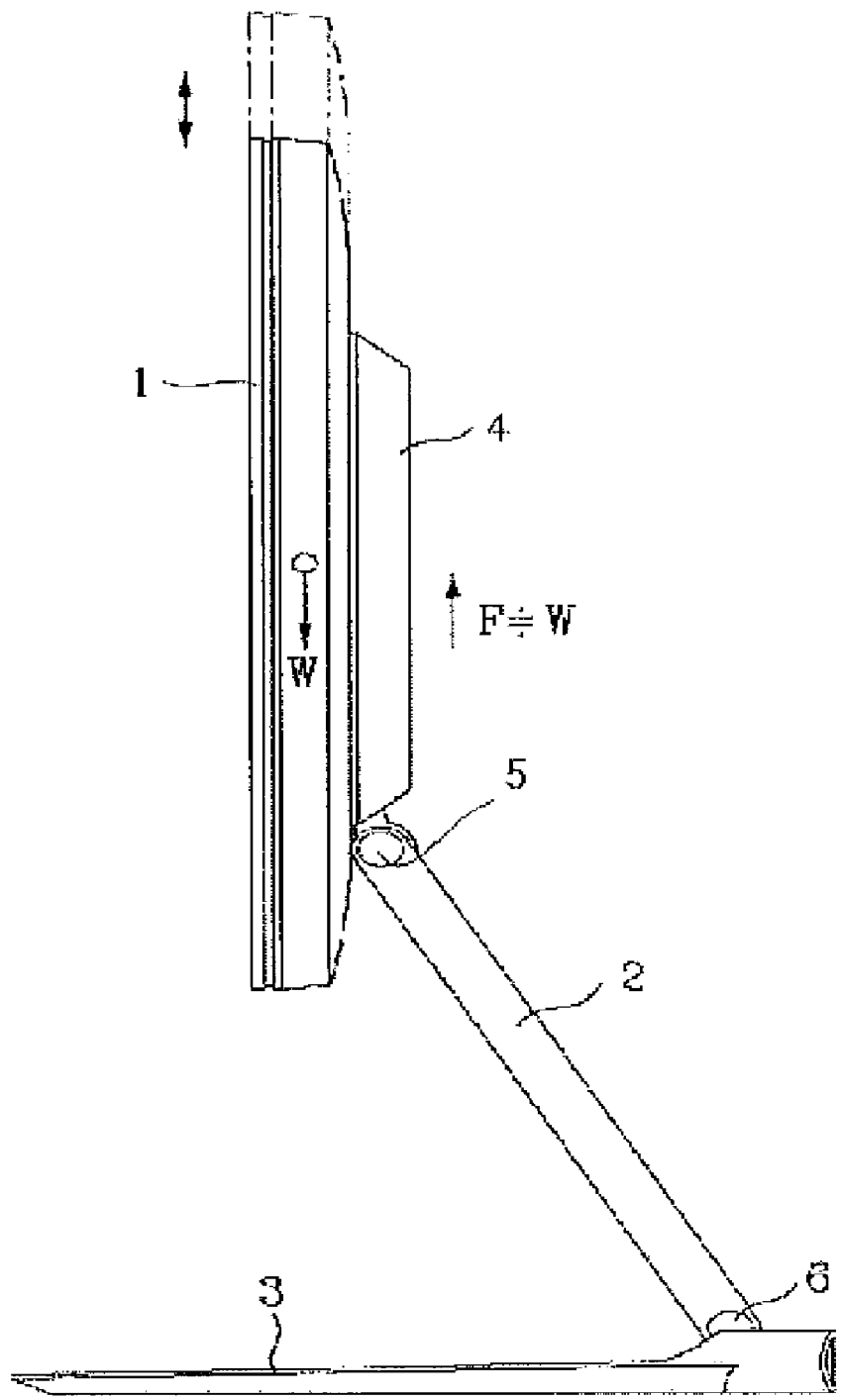
FIG. 1 is a side view of a monitor installed on a monitor stand according to the related art.
Figure 2:
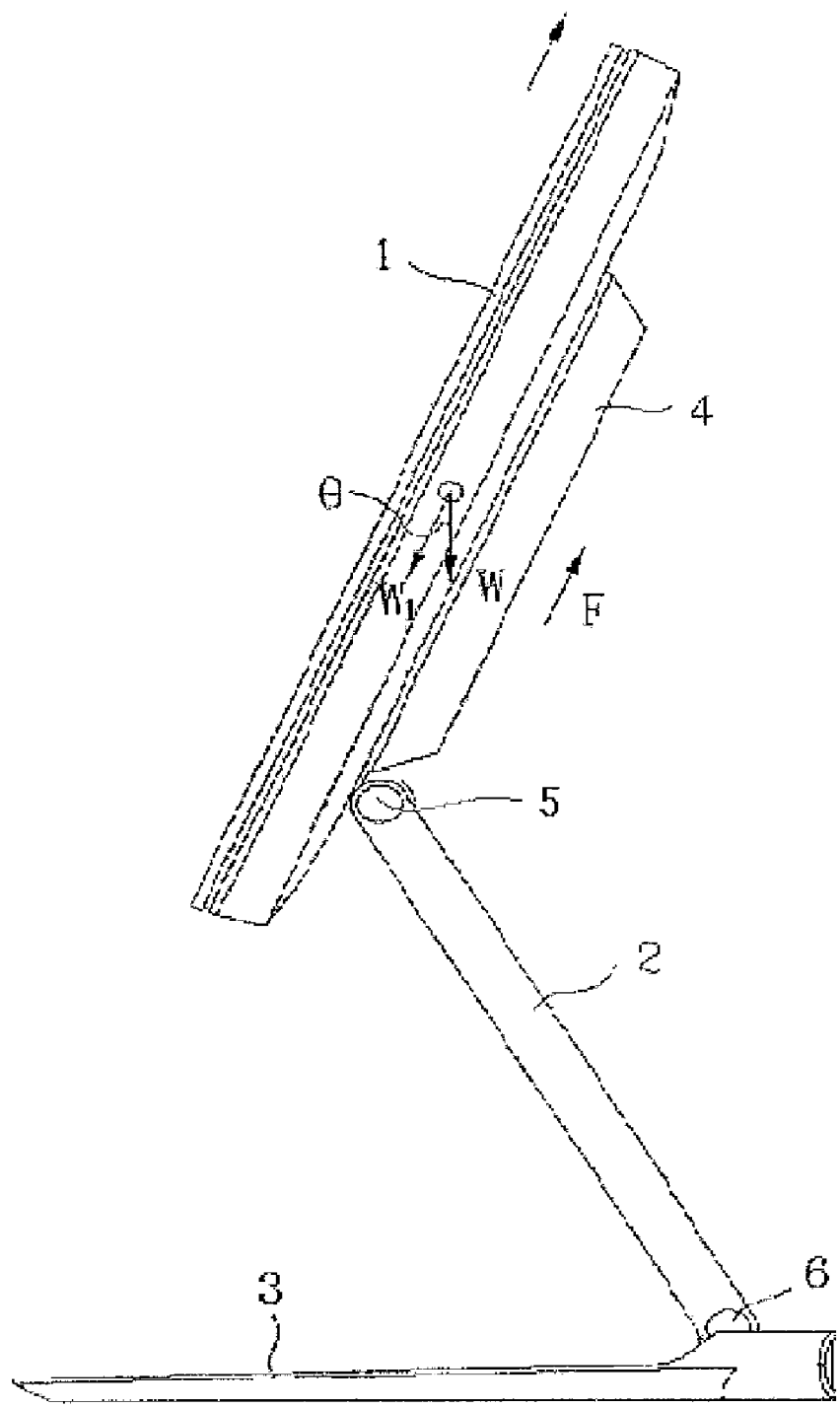
FIG. 2 is a side view of a monitor installed on a monitor stand according to the related art, where the angle of the monitor has been adjusted.
Figure 3:
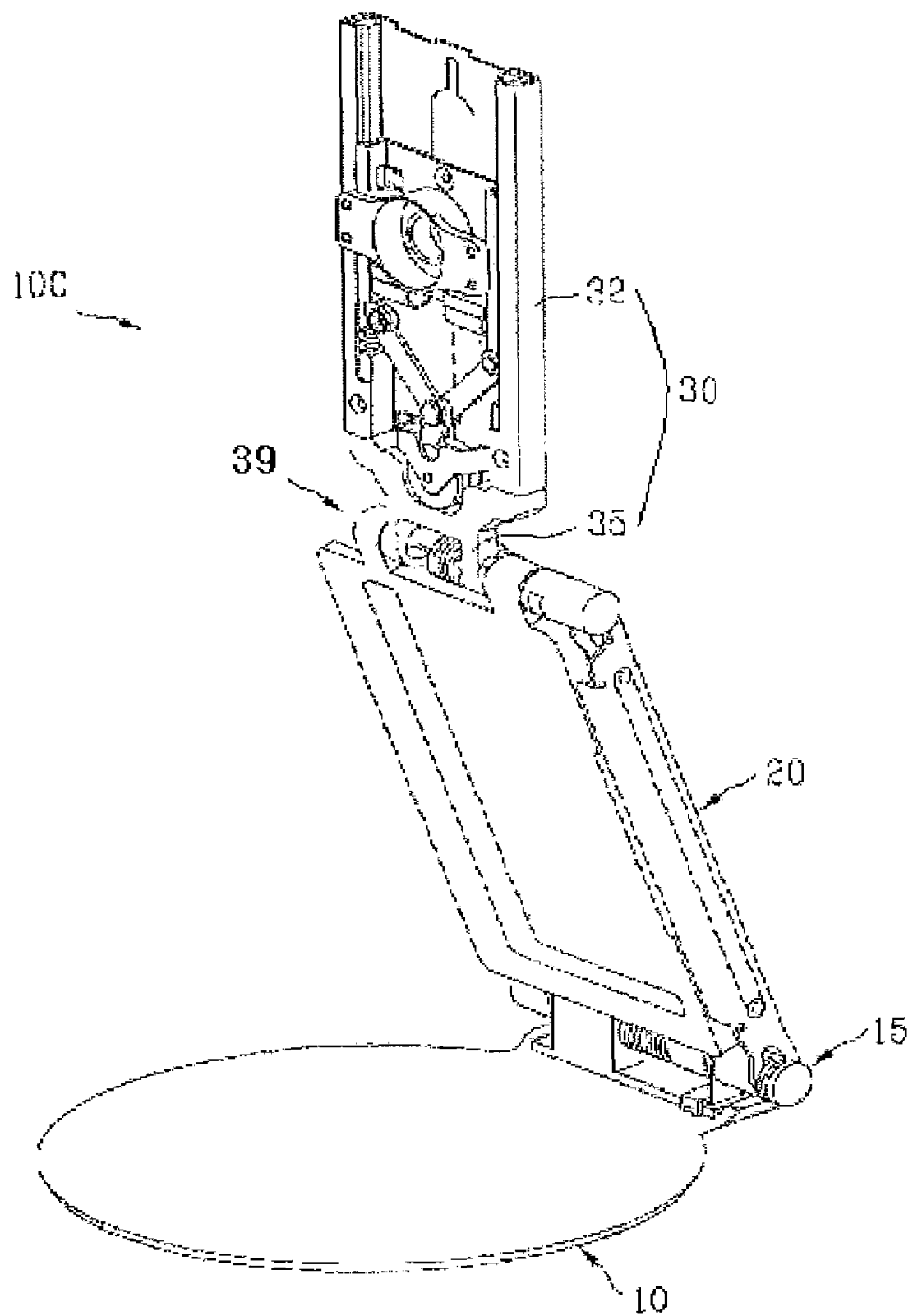
FIG. 3 is a perspective view of a monitor stand according to the present invention.

Reference will now be made in detail to the preferred embodiments of the present invention, examples of which are illustrated in the accompanying drawings. Wherever possible, the same reference numbers will be used throughout the drawings to refer to the same or like parts:

Referring to FIG. 3, a monitor stand 100 according to the present invention includes a base 10, a stand body 20, and a stand top assembly 30 installed to allow the monitor to slide.

The base 10 may be formed in a flat plate shape to rest on a desk or other flat surface.

The stand body 20 is supported by the base 10, and in the present embodiment, the stand body and the base are coupled through the lower hinge 15 to be capable of pivoting; however, the structure thereof is not limited thereto. That is, the stand body 20 may be fixed to the base 10 in a non-pivotable manner. The lower hinge 15 may impart a predetermined degree of elasticity to the stand body by means of a coil spring provided within. The balance between this elasticity and a friction between components allows the stand body 20 to retain its position at a predetermined angle to which it has been pivoted.

The stand body 20 pivotably supports a stand top assembly 30, which is achieved through an upper hinge 39. The stand top assembly 30 according to the present embodiment includes a separately manufactured stand top 32 and a stand top supporter 35 that are assembled together, but may alternately be a single piece formed through casting.

The stand top 32 may be made as a flat metal plate with both side ends thereof bent to form guide rails 32a. In this embodiment, holes 32b are formed in the guide rails 32a, to insert protrusions 34a of guide pads 34 (described below), in order to fix the guide pads 34 to the guide rails 32a.

Figure 4:
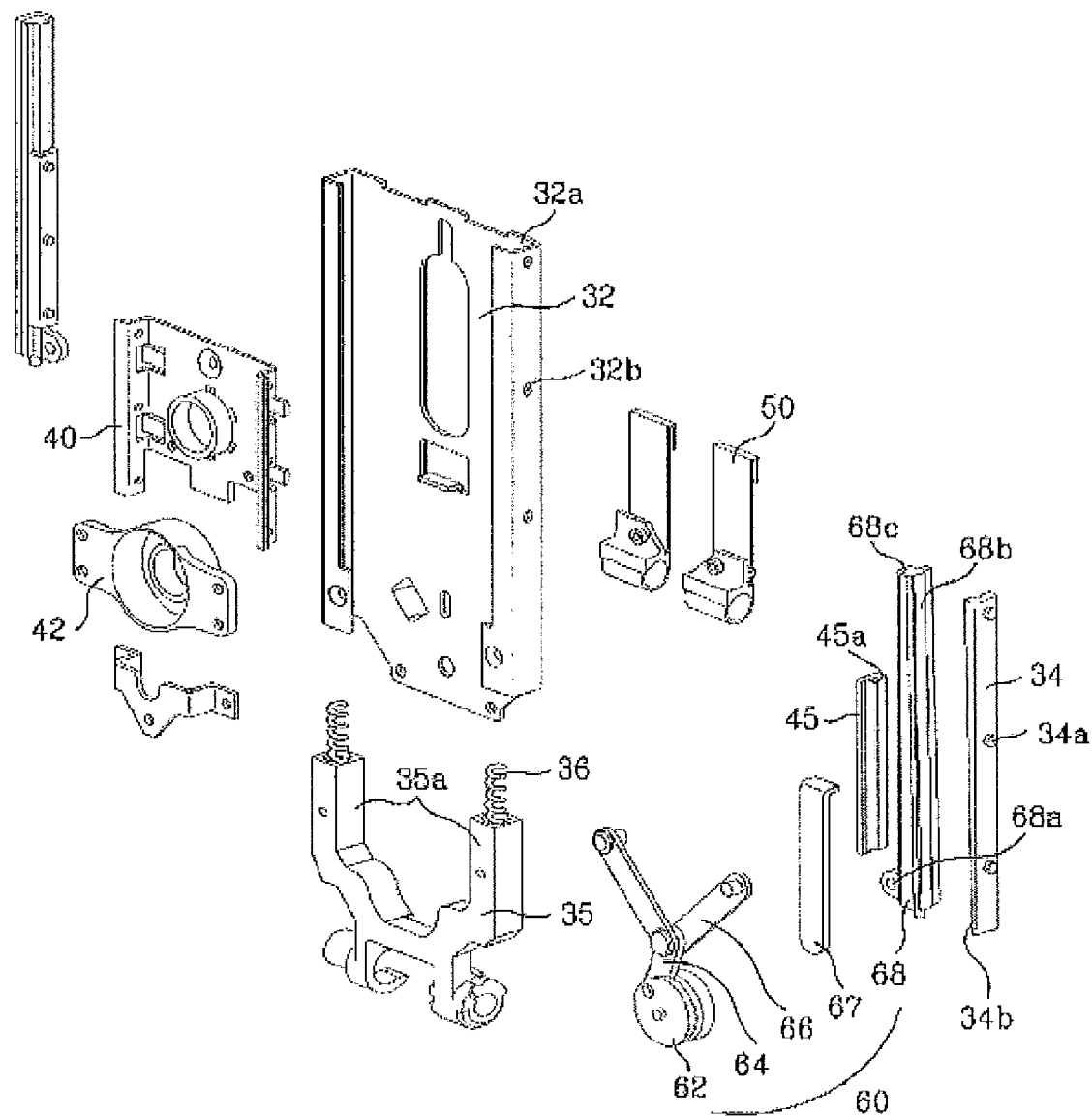
FIG. 4 is an exploded perspective view of a monitor stand top of a monitor stand and components coupled therewith according to the present invention.
Figure 5:
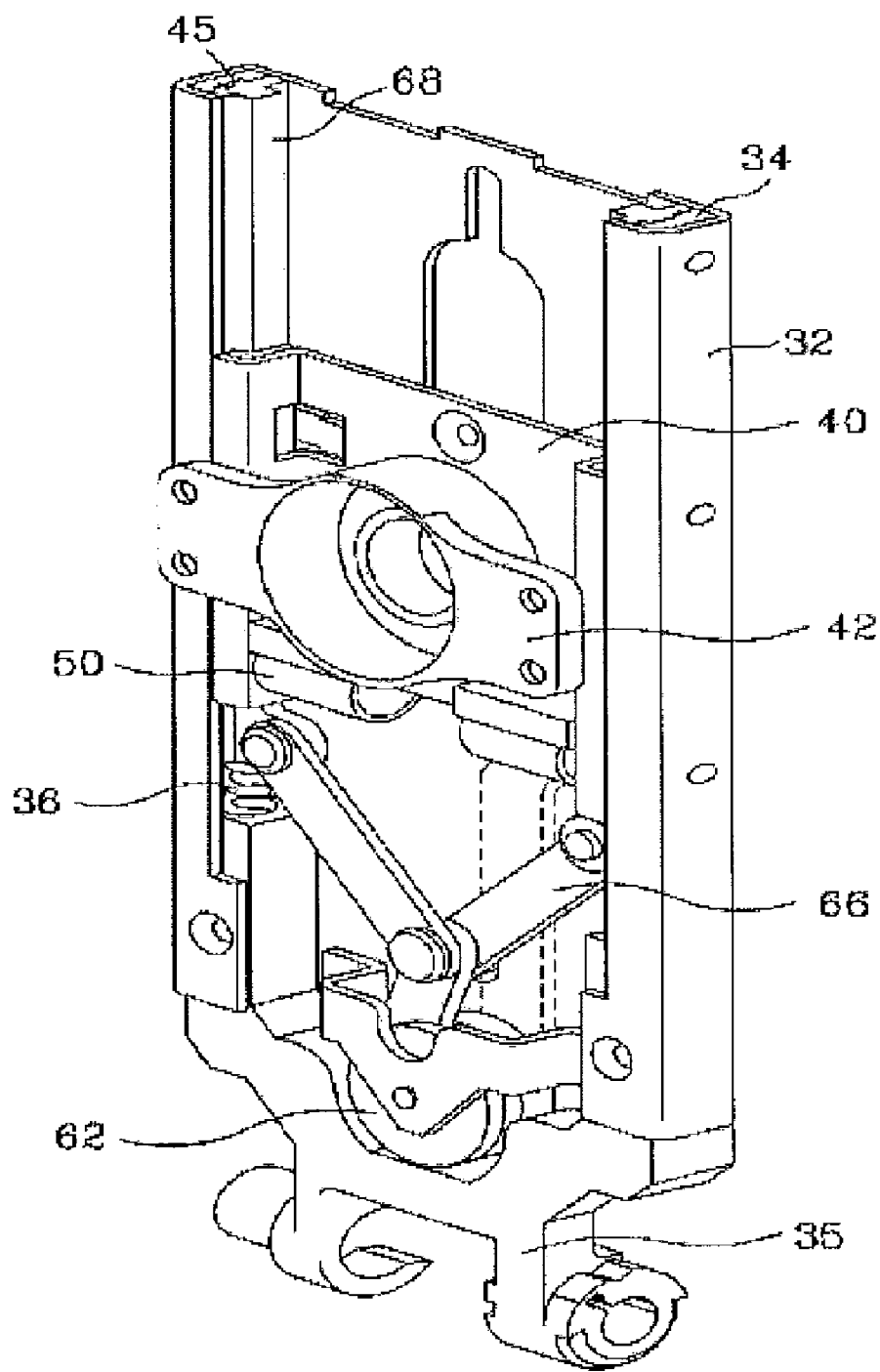
FIG. 5 is a perspective view of the components in FIG. 4 in an assembled state.

The guide pads 34 in FIG. 4 are pieces that have inclined surfaces 34b that incline inward as they go along to the top; alternately, the sides of the guide rail 32a (the side in which the holes 32b are formed) may be inclined inward in an upward direction, in which case, the guide pads 34 are not required.

The stand top 32 is fixed to the stand top supporter 35, and a support bar 35a of the stand top supporter 35 has a coil spring 36 installed therein for elastically supporting a clutch pad 68.

The stand top 32 also has a top slide 40 installed slidably thereon. The monitor may be directly installed on the top slide 40; however, in the present embodiment, the monitor is installed on a monitor fixing bracket 42 installed on the top slide 40.

Both sides of the top slide 40 facing each other are bent and coupled here to the slide pad 45. The central outer surface of the slide pad 45 has a slot 45a of a predetermined depth formed therein, and the ridge 68c formed on the inner surface of the clutch pad 68 is inserted in the slot 45a.

The elastic member 50 installed on the stand top 32 is for providing elasticity to the top slide 40 in an upward direction, to counter the weight of the monitor. After a user lifts or lowers the monitor to a desired height, when force is removed from the monitor, the elasticity and friction between the components allows the monitor to retain its newly adjusted position. The elastic member 50 may be a spiral spring that is formed of a wound metal plate, for example. The upper end of the elastic member 50 is fixed to the stand top 32, and the lower end is fixed to the top slide 40.

The stand top 32 has a friction clutch 60 installed thereon. This is a means for preventing the occurrence of auto lift up (as in the related art). Specifically, the friction clutch 60 confines and/or releases the top slide 40 to/from the stand top 32, and includes a rotating plate 62, a rotating link 64, a pair of connecting links 66, a lever 67, and a clutch pad 68.

The rotating plate 62 has a pair of round plates coupled together in the middle with a gap therebetween. A rotating shaft (not shown) that is formed in the center thereof is supported by the stand top 32. Referring to FIG. 4, the outer portion of the rotating plate 62 has one end of the rotating link 64 linked via a hinge thereto. The other end of the rotating link 64 is coupled via a hinge to a connecting hole 68a of the clutch pad 68. Accordingly, when the rotating plate 62 rotates a predetermined angle, the clutch pad 68 slides vertically.

The clutch pad 68 is disposed between the inclined surface 34b and the slide pad 45, and forms the surface opposite the inclined surface 34b, that is, the opposite inclined surface 68b. The surface opposite to the opposite inclined surface 68b, that is, the surface that provides friction with the slide pad 45, forms a protrusion 68c opposite to the slot 45a of the slide pad 45. This guides the movement of the slide pad 45.

A lever 67 is coupled at the center of the rotating plate 62. The lever 67, may be formed as a stick, and used to slide the clutch pad 68.

The application of the above-described monitor stand will now be described.

When a user moves the monitor vertically, first, the lever 67 of the friction clutch is rotated to move the clutch pad 45 downward. In this process, the one end of the rotating link 64 rotates around the rotating plate 62. Accordingly, the one end of the connecting link 66 connected to the other end of the rotating link descends, so that the clutch pad 68 coupled by a hinge to the other end of the connecting link 66 also descends. Here, the coil spring 36 installed on the stand top supporter 35 is compressed to a certain degree by the clutch pad 68.

Thus, a gap is created between the inclined surface 34b and the opposite inclined surface 68b, according to the descending of the clutch pad 68. Accordingly, a gap is created between the slide pad 45 and the clutch pad 68, so that the confining of the top slide 40 by the clutch pad 68 is released. Here, the user may move the monitor to a desired height.

After the height adjusting of the monitor is finished, when the lever 67 is released, the elasticity of the coil spring 36 raises the clutch 68 again, whereupon the clutch 68 provides friction against the slide pad 45 to once again confine the top slide 40.

The vertical range of movement of the clutch pad 68 is limited by the inclined surface 34b. Although the clutch must be manipulated in order to raise the monitor, when lowering the monitor, there is no need for such manipulation, and the monitor (or the top slide 40 fixed thereto) may simply be pushed downward. This is because the clutch pad 68 can be released by the compression of the coil spring 36.

When the top slide 40 is confined by the clutch pad 68, a user may tilt the monitor fixed to the top slide 40 to a desired angle, without the occurrence of auto lift up, as in the related art.

This is because when the top slide 40 is confined by the clutch 68, the monitor does not move upward when an upward force is imparted thereto. Specifically, this is due to a frictional force between the slide pad 45 and the clutch pad 68 that greatly increases by means of the inclined surface 34b and the opposite inclined surface 68b, to prevent rising of the monitor.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A monitor stand comprising:
   a base;
   a stand body supported by the base;
   a stand top assembly pivotably supported by the stand body;
   a top slide for sliding along the stand top assembly and having a monitor installed thereon;
   an elastic member supported on the stand top assembly, for providing elasticity to the top slide in an upward direction; and
   a frictional clutch for confining and releasing the top slide to and from the stand top assembly,
   wherein a gap is selectively created between the top slide and the frictional clutch when the top slide is released from the stand top assembly, and
   wherein the frictional clutch comprises a clutch pad selectively contacting the top slide for confining the top slide or spaced apart from the top slide for releasing the top slide.

2. The monitor stand according to claim 1, wherein the stand top assembly comprises:
   a stand top of which lateral ends are formed as a guide rail; and
   a stand top supporter pivotably supported by the stand body, for supporting the stand top.

3. The monitor stand according to claim 2, wherein the guide rail includes an inclined surface inclined inward in an upward direction on an inner side thereof, and the clutch pad is interposed between the top slide and the inclined surface, for sliding along the guide rail, the clutch pad having an opposite inclined surface facing the inclined surface.

4. The monitor stand according to claim 3, wherein the inclined surface is an inner surface of a guide pad disposed at the inner side of the guide rail of the stand top.

5. The monitor stand according to claim 3, wherein the inclined surface is an inner surface of the guide rail formed on the stand top.

6. The monitor stand according to claim 3, wherein a slide pad is fixed to the top slide, the slide pad being able to slide along the clutch pad.

7. The monitor stand according to claim 3, wherein the frictional clutch comprises:
   a rotating round plate rotatably coupled to the stand top;
   a rotating link connected to an outer portion of the rotating round plate through a hinge at one end thereof;
   a connecting link having one end for moving in a direction in which the guide rail extends, the one end of the connecting link being connected to the other end of the rotating link through a hinge; and
   a lever fixed at a center of the rotating round plate, wherein the other end of the connecting link is connected to the clutch pad through a hinge.

8. The monitor stand according to claim 3, wherein the clutch pad is elastically supported in an upward direction by the coil spring supported by the stand supporter.

9. The monitor stand according to claim 7, wherein the stand top comprises a rotating round plate fixing bracket installed thereon, for supporting the rotating round plate of the frictional clutch.

10. The monitor stand according to claim 1, wherein the elastic member is a spiral spring that winds and unwinds according to a position of the top slide.

11. The monitor stand according to claim 1, wherein the monitor is installed on the top slide with a monitor fixing bracket interposed there between.

* * * * *